US010108722B2

(12) United States Patent
Erera et al.

(10) Patent No.: US 10,108,722 B2
(45) Date of Patent: Oct. 23, 2018

(54) STABILITY SCORE BASED RE-RANKING OF SEARCH RESULTS

(71) Applicant: International Business Machines Corporation, Armonk, NY (US)

(72) Inventors: Shai Erera, Kiryat Ata (IL); Shay Hummel, Binayamina (IL); Ella Rabinovich, Haifa (IL); Haggai Roitman, Yokneam Elit (IL)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 14/698,872

(22) Filed: Apr. 29, 2015

(65) Prior Publication Data
US 2016/0321363 A1    Nov. 3, 2016

(51) Int. Cl.
*G06F 17/30*    (2006.01)

(52) U.S. Cl.
CPC .. *G06F 17/30867* (2013.01); *G06F 17/30699* (2013.01)

(58) Field of Classification Search
CPC ......... G06F 17/30867; G06F 17/30699; G06F 17/3053
USPC .......................................... 707/710, 723–735
See application file for complete search history.

(56) References Cited

U.S. PATENT DOCUMENTS

| 7,574,436 B2 | 8/2009 | Kapur et al. |
| 8,661,029 B1 | 2/2014 | Kim et al. |
| 8,762,389 B1 * | 6/2014 | Popovici ........... G06F 17/30646 707/748 |
| 2011/0184940 A1 * | 7/2011 | Fazil ................. G06F 17/30864 707/723 |
| 2013/0103672 A1 | 4/2013 | Parikh et al. |

OTHER PUBLICATIONS

Lior Meister et al., "Two are better than one! Re-ranking search results using an additional retrieved list", Israel Institute of Technology, 2014.
Yun Zhou and W. Bruce Croft., "Measuring Ranked List Robustness for Query Performance Prediction", Department of Computer Science University of Massachusetts, Amherst ,Nov. 11, 2006.

(Continued)

*Primary Examiner* — Hares Jami
(74) *Attorney, Agent, or Firm* — Daniel Kligler

(57) ABSTRACT

A method, including submitting, to a search engine, a first query including, and receiving, in response to the first query, a first list including first results, each of the first results having a respective first ranking. Keywords are derived from the first query, and for each keyword, a respective second query is submitted to the search engine, the respective second query including the first query term and the derived keyword. In response to each of the respective second queries, a respective second list including respective second results is received, each of the respective second results having a second ranking and a corresponding first result, and for each given second result, one or more stability scores are computed based on the second ranking of the given second result and the first ranking of the corresponding first result. The second results are ranked based on their respective one or more stability scores.

20 Claims, 3 Drawing Sheets

(56) References Cited

OTHER PUBLICATIONS

David Carmel and Elad Yom-Tov., "Estimating the Query Difficulty for Information Retrieval", Synthesis Lectures on Information Concepts, Retrieval, and Services, 2010, vol. 2, No. 1.

Elad YomTov et al., "Learning to estimate query difficulty: including applications to missing content detection and distributed information retrieval", SIGIR '05 Proceedings of the 28th annual international ACM SIGIR conference on Research and development in information retrieval, pp. 512-519, 2005.

* cited by examiner

STABILITY SCORE BASED RE-RANKING OF SEARCH RESULTS

FIELD OF THE INVENTION

This invention relates generally to information retrieval, and specifically to using stability scores to re-rank results of a search engine query.

BACKGROUND

Ranking of query results is one of the fundamental issues in information retrieval, the scientific/engineering discipline behind search engines. Given a query q and a collection D of documents that match the query, the problem is to rank, (i.e., sort) the documents in D according to some criterion so that the "best" results appear early in the result list displayed to the user. Typically, ranking criteria are phrased in terms of relevance of documents with respect to an information need that is expressed in the query.

The description above is presented as a general overview of related art in this field and should not be construed as an admission that any of the information it contains constitutes prior art against the present patent application.

SUMMARY

There is provided, in accordance with an embodiment of the present invention a method, including submitting, to a search engine, a first query including a first query term, receiving, in response to the first query, a first list including first results, each of the first results having a respective first ranking, deriving multiple keywords from the first query term, submitting, for each given derived keyword, a respective second query to the search engine, the respective second query including the first query term and the given derived keyword, receiving, in response to each of the respective second queries, a respective second list including respective second results, each of the respective second results having a second ranking and a corresponding first result, computing, for each given second result, one or more stability scores based on the second ranking of the given second result and the first ranking of the corresponding first result, and ranking the second results based on their respective one or more stability scores.

There is also provided, in accordance with an embodiment of the present invention an apparatus, including a memory, and a processor configured to submit, to a search engine, a first query including a first query term, to receive, in response to the first query, a first list including first results, each of the first results having a respective first ranking, to derive multiple keywords from the first query term, to submit, for each given derived keyword, a respective second query to the search engine, the respective second query including the first query term and the given derived keyword, to receive, in response to each of the respective second queries, a respective second list including second results, each of the respective second results having a second ranking and a corresponding first result, to compute, for each given second result, one or more stability scores based on the second ranking of the given second result and the first ranking of the corresponding first result, and to rank, in the memory, the second results based on their respective one or more stability scores.

There is further provided, in accordance with an embodiment of the present invention a computer program product, the computer program product including a non-transitory computer readable storage medium having computer readable program code embodied therewith, the computer readable program code including computer readable program code configured to submit, to a search engine, a first query including a first query term, computer readable program code configured to receive, in response to the first query, a first list including first results, each of the first results having a respective first ranking, computer readable program code configured to derive multiple keywords from the first query term, computer readable program code configured to submit, for each given derived keyword, a respective second query to the search engine, the respective second query including the first query term and the given derived keyword, computer readable program code configured to receive, in response to each of the respective second queries, a respective second list including respective second results, each of the respective second results having a second ranking and a corresponding first result, computer readable program code configured to compute, for each given second result, one or more stability scores based on the second ranking of the given second result and the first ranking of the corresponding first result, and computer readable program code configured to rank the second results based on their respective one or more stability scores.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for re-ranking search results. As explained hereinbelow, in response to submitting a first query comprising a first query term to a search engine, a first list of first results is received, wherein each of the first results has a respective first ranking. The first query term may comprise words (e.g., keywords such as "test", "hello"), phrases (e.g., a group of keywords surrounded by double quotes such as "operating system") and logical operators (e.g., "+", "−", "AND", "OR"). Additionally, multiple query terms can be combined together with Boolean operators to form a more complex query.

Subsequent to receiving the first results, multiple keywords are derived from the first query term, and for each given derived keyword, a respective second query comprising the first query term and the given derived keyword is submitted to the search engine. In response to submitting each of the second queries, a respective second list comprising respective second results is received, wherein each of the respective second results has a second ranking.

Since each of the second query terms includes the first query term, each of the second lists typically comprises a subset of the first list. Therefore, each of the second results has a corresponding first result. Additionally, each of the first and the second results has a respective ranking in their respective lists. In embodiments of the present invention, a given second result in a given second list is considered to be stable if the second ranking of the second result in the second list is greater than or equal to the first ranking of the corresponding first result in the first list.

Upon receiving the second results, one or more stability scores can be calculated for each of the second results. As described hereinbelow, factors for calculating a stability score for a given second result in a given second list may include the second ranking of the given second result in the given second list, the first ranking of the corresponding first result in the first list, and a number of stable second results in the given second list.

Finally, each of the second results can be ranked based on their respective one or more stability scores. In some embodiments, for each given second list, a list quality score can be calculated that indicates a quality of the given second list against the first list, and each given second result in the second given list can be ranked based on its respective one or more stability scores and the list quality score for the given second list.

Figure 1:
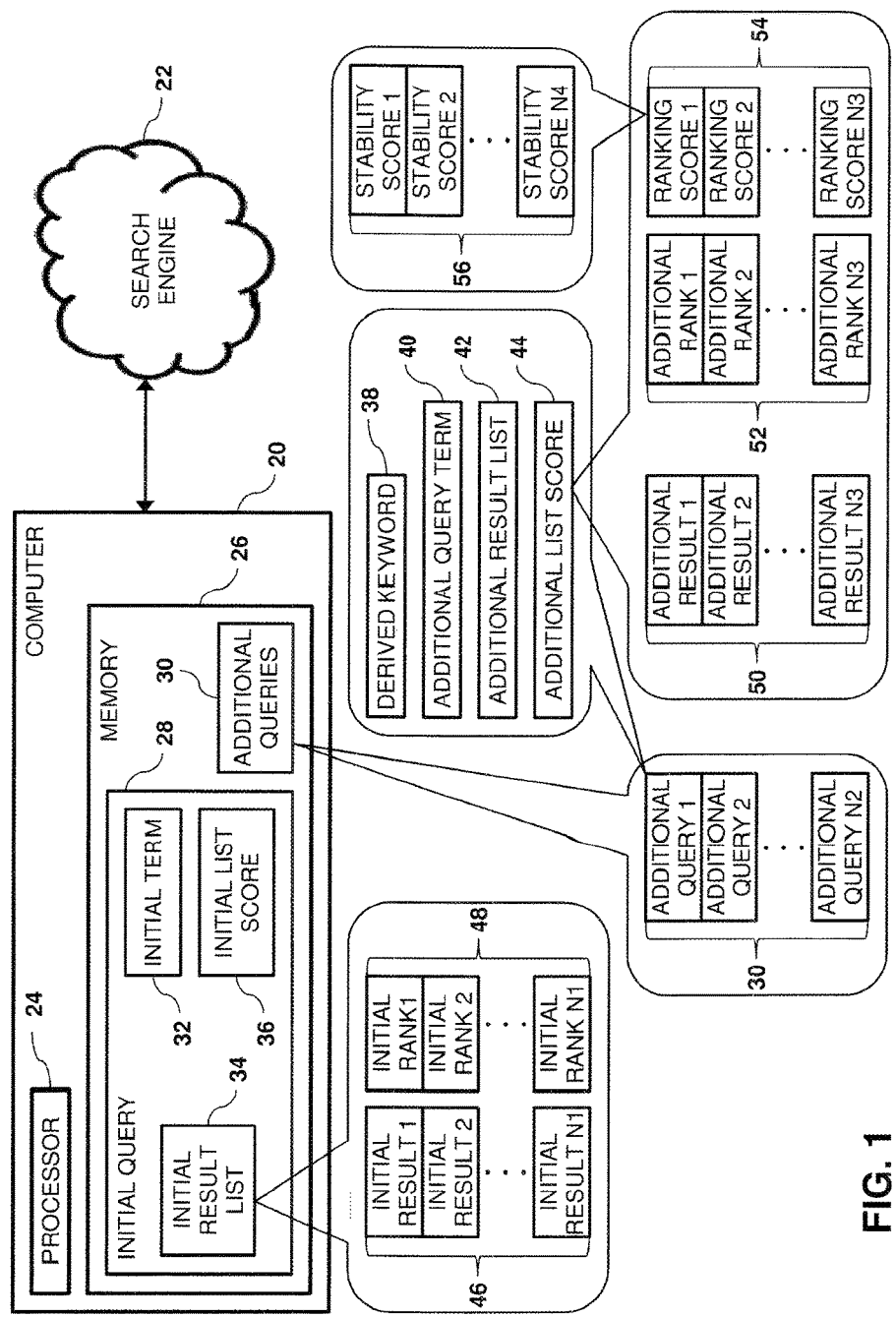
FIG. 1 is a block diagram that schematically illustrates a computer system configured to re-rank search engine results, in accordance with an embodiment of the present invention.

FIG. 1 is a block diagram that schematically illustrates a computer 20 configured to re-rank search results received from a search engine 22, in accordance with an embodiment of the present invention. Computer 20 comprises a processor 24 and a memory 26 configured to store an initial query 28 (also referred to herein as a first query) and multiple additional queries 30 (also referred to herein as second queries). Initial query 28 comprises an initial query term 32 (also referred to herein as a first query term), an initial result list 34 and an initial list score 36 (also referred to herein as a first list quality score), and each additional query 30 comprises an additional keyword 38, an additional query term 40, an additional result list 42 (also referred to herein as second results) and an additional list score 44 (also referred to herein as a second list quality score).

In operation, processor 24 is configured to perform initial query 28 by conveying, from memory 26, initial query term 32 to search engine 22, and to perform each additional query 30 by deriving a given additional keyword 38, defining a given additional term 40 based on the initial and the given derived query terms, and submitting the given additional query term to the search engine. In some embodiments, processor 24 can employ an algorithm such as a relevance model or a knowledge model to derive additional keywords 38. To create each additional query term 40, processor 24 can concatenate a given additional keyword 38 to initial query term 32. Since only one additional keyword is concatenated to initial query term 32 to create the additional query terms, the number of the additional query terms comprises the number of the derived keywords.

In response to submitting initial query term 32, processor receives, from search engine 22, initial result list 34 comprising initial results 46 (also referred to herein as first results), each of the initial results having a respective initial rank 48 (also referred to herein as a first ranking). Upon receiving initial result list 34, processor 24 can calculate initial list score 36 that indicates a quality of initial result 46 by taking into account factors such as landing page quality, landing page load time and geographical considerations for each initial result 46.

In response to submitting each additional query 30, processor 24 receives, from search engine 22, a given additional result list 42 comprising additional results 50 (also referred to herein as second results), each of the additional results having a respective additional rank 52 (also referred to herein as a second ranking). Upon receiving a given additional result list 42, processor 24 can calculate the respective additional list score 44 that indicates a quality of the given the additional results in the given additional result list.

Similar to initial list score 36, processor 24 can calculate each respective additional list score 44 can take into account factors such as landing page quality, landing page load time and geographical considerations for each of the additional results in the given additional list. Additionally, processor 24 calculates a respective ranking score 54 for each additional result 50. In embodiments of the present invention, processor 24 use the ranking score to rank additional results 50.

As described in the description referencing FIGS. 2 and 3 hereinbelow, processor 24 can calculate one or more stability scores 56 for a given additional result 59, and use the one or more stability scores to calculate the respective ranking score for the given additional result. In some embodiments, processor can calculate a given ranking score for a given additional result 50 in a given additional result list 42 based on the one or more stability scores 56 for the given additional result and the additional list score for the given additional list.

Processor 24 comprises a general-purpose central processing unit (CPU) or special-purpose embedded processors, which are programmed in software or firmware to carry out the functions described herein. The software may be downloaded to computer 20 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Search Result Re-Rankin2

Figure 2:
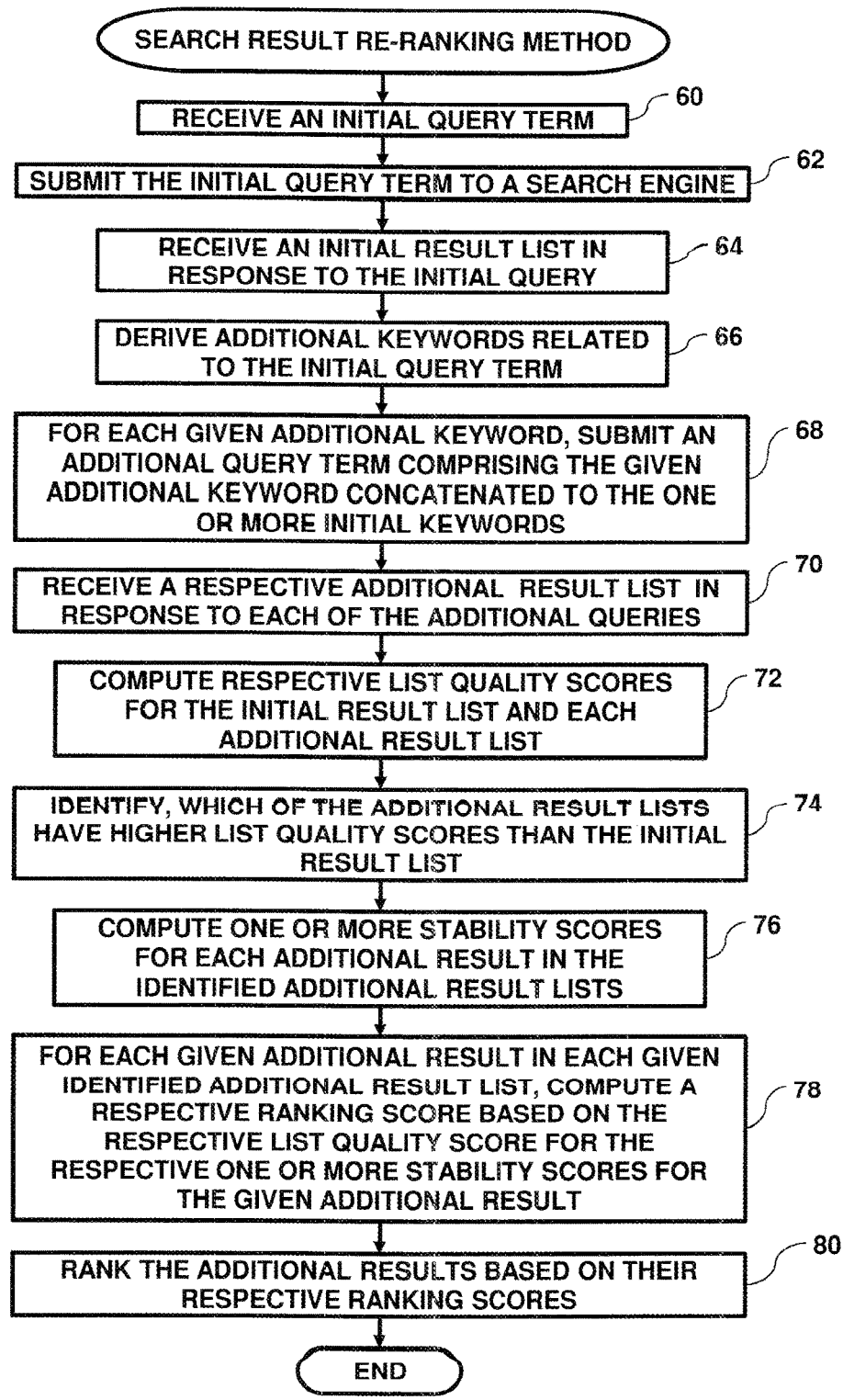
FIG. 2 is a flow diagram that schematically illustrates a method of using one or more stability scores to re-rank search engine results, in accordance with an embodiment of the preset invention.

FIG. 2 is a flow diagram that schematically illustrates a method of re-ranking initial results 46, in accordance with an embodiment of the preset invention. As described supra, each additional result 50 has a corresponding initial result 46. Therefore, processor 24 can re-rank initial results 46 by re-ranking additional results 50.

In a receive step 60, processor 24 receives initial query term 32 (also referred to herein as topic 32) comprising one or more words, phrases and logical operators (as described supra), and in a first submission step 62, the processor submits the initial query term to search engine 22. In a first receive step 64, processor 24 receives initial result list 34 in response to submitting the first query term, and in a derivation step 66, the processor derives additional keywords 38 (also referred to herein as aspects 38) using embodiments described hereinabove. For example, if the initial query term comprises "java programming", examples of additional keywords 38 may include "JVM" and "compiler."

In a second submission step 68, for each given additional keyword 38, processor 24 submits, to search engine 22, a given additional query term 40 comprising the given additional keyword concatenated to initial query term 32. In the example described hereinabove, processor 24 submits, to search engine 22, a first additional query term 40 comprising "java programming JVM" and a second additional query term "java programming compiler." In a second receive step 70, processor 24 receives a respective additional result list 42 in response to submitting each of the additional query terms.

In a first computation step 72, processor 24 computes initial list score 36 for initial result list 34, and computes a respective additional list score 44 for each additional result list 42. To compute initial list score 36 and additional list scores 44, processor 24 can use an algorithm such as the RM3 relevance model.

In an identification step 74, processor 24 identifies any of the additional result lists whose respective additional list score 44 is greater than initial list score 36, and in a second computation step 76, the processor computes on or more stability scores 56 for each additional result 50 in the identified additional result lists. Stability scores 56 are described in the description referencing FIG. 3 hereinbelow.

In a third computation step 78, for each given additional result 50 in each of the given identified additional lists, processor 24 computes a respective ranking score 54 based the one or more stability scores for the given additional result. In an alternative embodiment, processor 24 can computes the respective ranking score 54 based on the additional list score of the given additional list, and the one or more stability scores for the given additional result. The computation of ranking scores 54 is described in detail hereinbelow. Finally, in a ranking step 80, processor 24 ranks additional results 50 in memory 26 based on their respective ranking scores 54, and the method ends.

Figure 3:
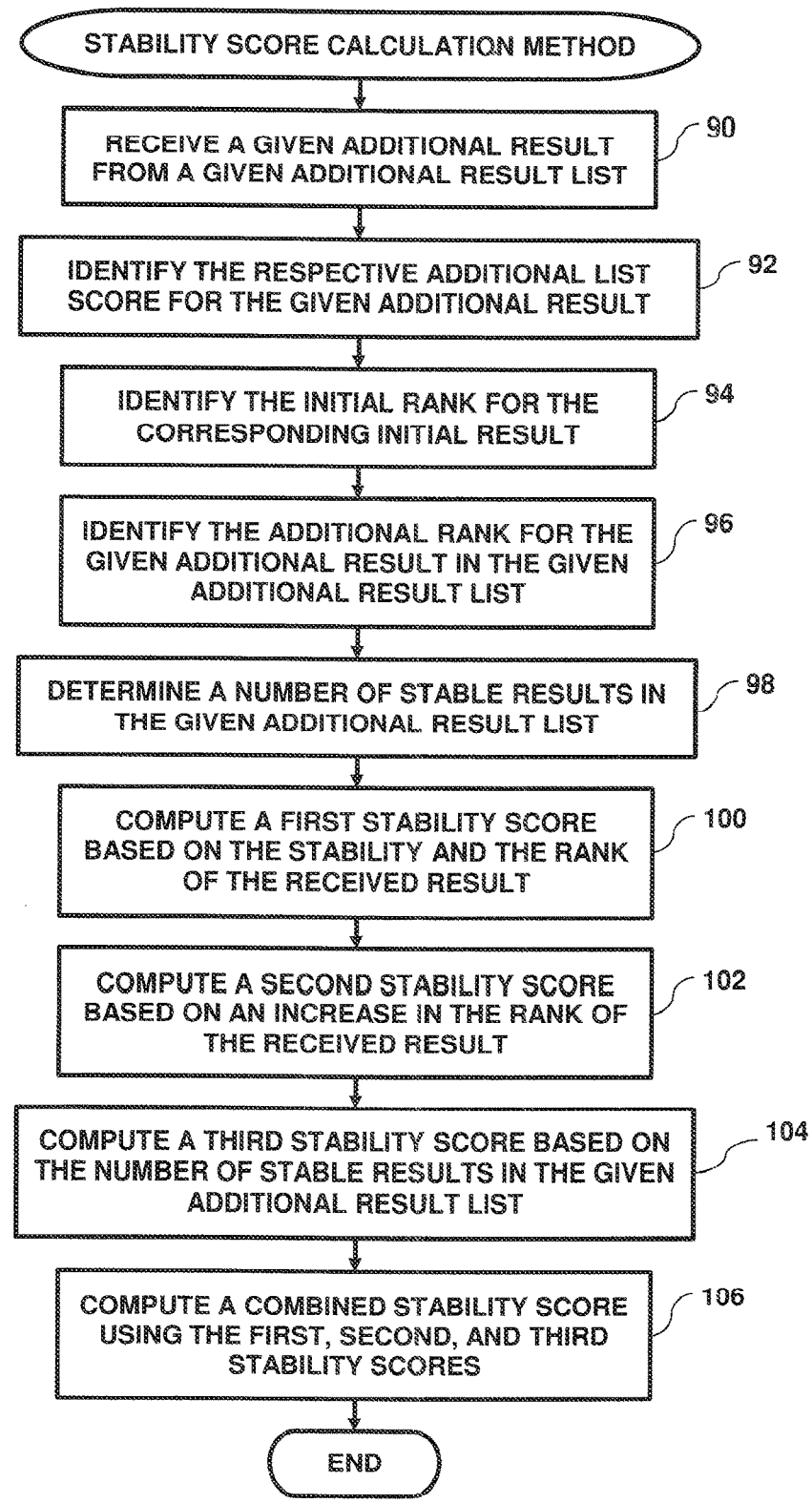
FIG. 3 is a flow diagram that schematically illustrates a method of calculating the stability scores, in accordance with an embodiment of the preset invention.

FIG. 3 is a flow diagram that schematically illustrates a method of calculating stability scores 56, in accordance with an embodiment of the preset invention. In a receive step 90, processor 24 receives a given additional result 50 from a given additional result list 42, and in a first identification step 92, the processor identifies the respective additional list score for the given additional list.

In a second identification step 94, processor identifies the initial rank of the initial result corresponding to the given additional result (also referred to herein as a first ranking), and in a third identification step 96, the processor identifies the additional rank of the given additional result in the given additional result list (also referred to herein as a second ranking). As described supra, the given additional result is considered to be stable if the second ranking is the same or higher than the first ranking. In a determination step 98, processor 24 determines a number of stable additional results 50 in the given additional list, by comparing the additional rank of each of the additional results in the given additional list to the respective initial ranks of their corresponding initial results 46.

In a first computation step 100, processor 24 computes a first stability score 56 that measures a stability of the given additional result. As explained in the description referencing Equation (3) in an Appendix presented hereinbelow, when calculating the first stability score, processor 24 uses factors such as the first ranking and the second ranking. In addition to comparing the first ranking to the second ranking, processor can assign greater importance to stable documents (i.e., additional search results) that have higher first rankings, since those documents are "harder" to remain stable.

In a second compute step 102, processor 24 computes a second stability score based on an increase in the stability score for the given additional result (i.e., for the given additional result, the second ranking is higher than the first ranking), as described in the description of Equation (5) in the Appendix presented hereinbelow. In a third compute step 104, processor 24 computes a third stability score based on a number of stable additional results 50 in the given additional list. As described in the description referencing Equation (6) in the Appendix presented hereinbelow, the stability of the given additional result can be assigned a lower weight (i.e., is less important) with greater numbers of stable additional results 50 in the given additional list.

Finally, in a fourth compute step 106, processor 24 computes a combined stability score based on the three stability scores computed in steps 100, 102 and 104, and the method ends. Computation of the combined stability score is described in Equations (7)-(9) in the Appendix presented hereinbelow.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix—Calculating Stability and Ranking Scores

This appendix presents calculations that can be used to compute the stability and the ranking scores, in accordance with an embodiment of the present invention. In embodiments of the present invention, let q denote a query (i.e., a topic such as initial query term 32 and additional query terms 40), capturing some information need $I_q$, submitted to some retrieval method M over a corpus of documents D. Let $D_q^{[k]} \subseteq D$ denote the result list of the k highest ranked documents returned by method M in response to q. Let $Score_q(d)$ and $r_{d;q}$ further denote the score of document $d \in D$ according to method M and its rank in $D_q^{[k]}$, respectively. For a given query q, let $A_q$ denote a set of topic aspects (or aspects for short); each aspect $\alpha \in A_q$ encodes some possible facet of the main topic expressed in q.

The first step in the proposed approach "generates" a set of aspect-responses (returned by the same method M) based on a given aspect set $A_q$ related to query q. Let $p(a;I_q)$ denote the importance ("association strength") of a "candidate" aspect a to the information need (topic) $I_q$ being searched. With the absence of relevance judgment, p(a;q) may serve as an approximation of $p(a;I_q)$ and may be estimated in various ways (e.g., using relevance models, topic models, etc). For a given query q, its corresponding topic aspect set $A_q$ is derived by considering the top-n candidate aspects a with the highest p(a;q) likelihood.

Using a term-at-a-time query expansion approach, for each given aspect $\alpha \in A_q$, its corresponding aspect-response is generated by expanding query q with that single aspect. Such expansion is simply implemented by adding the aspect as an additional disjunctive term to the query, i.e., $q \lor \alpha$. Let $D_{q \lor \alpha}^{[k]}$ denote the aspect-response returned by method M given $q \lor \alpha$, containing the top-k documents in D with the highest score $Score_{q \lor \alpha}(d)$. The purpose of this step is to find a subset of aspects in $A_q$ to which the underline retrieval method M may provide "reasonable" coverage.

For a given aspect $\alpha \in A_q$, let $P_{rsp}(\alpha)$ comprise a query performance prediction (QPP) method that denotes the predicted quality of aspect-response $D_{q \lor \alpha}^{[k]}$. Examples of QPP methods that processor 24 can use for scoring initial list score 36 and additional list scores 44 include, but are not limited to, Normalized Query Commitment (NQC), Weighted Information Gain (WIG), Clarity, query-perturbation based Query Feedback (QF), Score Ratio (S-RATIO), list diameter (L-DIAM) and list entropy (L-ENT).

A concrete predictor that may be considered as a possible implementation of $P_{rsp}(\alpha)$ for estimating a given aspect-response quality is based on the Normalized Query Commitment (NQC) post-retrieval QPP method. The NQC measure provides an elegant connection between the retrieval quality of a given response made by method M and the possibility of a query-drift that may exist within such response. An attractive property of NQC, which makes it a good candidate for implementing $P_{rsp}(\alpha)$ in this work, is that, it can be used to assess the response quality of any retrieval method M with no prior assumptions about the exact retrieval model in mind. To this end, for a given query q, NQC only explores the scores $Score_q(d)$ that were assigned to documents in D by method M.

According to the NQC measure, the higher the predicted "amount" of query-drift, the lower the predicted quality of that response. The "amount" of query-drift is estimated by NQC to be in reverse proportion to the variance (i.e., spread) of the document scores $Score_q(d)$, as determined by method M. For a given response $D_q^{[k]}$ made by method M (either directly for the original query q or its expanded version q ∨ α), let $S_q^2$ denote the sample score variance ("spread"), defined as follows:

$$S_q^2 \stackrel{def}{=} \frac{1}{k} \sum_{d \in D_q^{[k]}} [Score_q(d) - Score_q(D_q^{[k]})]^2, \quad (1)$$

where $Score_q(D_q^{[k]})$ denotes the mean score of documents in $D_q^{[k]}$ (the "Centroid"). The NQC measure for a given response $D_q^{[k]}$ is then calculated as follows:

$$NQC(D_q^{[k]}) \stackrel{def}{=} \frac{\sqrt{S_q^2}}{Score_q(\mathcal{D})}, \quad (2)$$

where $Score_q(D)$ further denotes the (mean) collection score (according to method M) given query q.

According to this measure, the higher the spread of document scores $Score_q(d)$ with respect to $Score_q(D_q^{[k]})$ is, the better is the ability of the "centroid" $D_q^{[k]}$, represented by the mean score $Score_q(D_q^{[k]})$, to detect "misleader" documents. Hence, documents that are scored higher than $Score_q(D_q^{[k]})$ have a better chance to correctly cover the information need (and therefore, be relevant); and those that are scored lower, have a better chance to be determined as non-relevant.

Given the set of aspect-response lists $\{D_q \vee_\alpha^{[k]}\}$, the next step in the proposed approach utilizes such "promising" lists for re-ranking the documents in the initial retrieved list. A new document property, termed "aspect-stability" that is now formally defined, shall serve as a key enabler for "transforming the aspect-response quality predictions into concrete document scores for re-ranking.

In embodiments of the present invention, a document $d \in D_q^{[k]}$ is defined as "aspect-stable" with respect to a given aspect $\alpha \in A_q$ iff d is also included in $D_q \vee_\alpha^{[k]}$ and its initial rank in $D_q^{[k]}$ has not been downgraded by method M in $D_q^{[k]}$. Formally, let δ [θ] denote the Kronecker-delta (indicator) function, receiving the value of 1 if the condition expressed by θ is satisfied, else 0. For a given document $d \in D_q^{[k]}$, aspect $\alpha \in A_q$ and aspect response $D_q \vee_\alpha^{[k]}$, let $\delta_{d;\alpha}$ encode the fact that document d is aspect-stable (or not), i.e.:

$$\delta_{d;\alpha} \stackrel{def}{=} \delta[d \in D_q^{[k]} \cap D_{q\vee a}^{[k]} \wedge r_{d;q\vee a} \leq r_{d;q}] \quad (3)$$

Note that, the criterion for aspect-stability defined in Equation (3) strictly requires that the document's rank will not be downgraded when query q is emphasized with respect to aspect a. Yet, this criterion makes no further distinctions about the possibility for improvement in the document's rank within the aspect-response itself. Such possible improvement should be further taken into consideration when scoring documents based on their aspect-stability.

As may be implied by this criterion, based on method M responses, a document that is aspect-stable may keep its relative quality with respect to the original information need $I_q$. In addition, such a document may provide a similar (relative) quality guarantee (and sometimes even a better one, i.e., when $r_{d;q} \vee_\alpha < r_{d;q}$) when being required to cover a specific aspect $\alpha \in A_q$; yet, still in the context of the original query q. Therefore, aspect-stability provides a valuable evidence for a given document's ability to provide "reasonable" coverage to a specific aspect of the main information need, yet not "sacrificing" its relative quality with respect to the original information need. Trying to generalize on such document property, this work hypothesizes that, a document that remains stable with respect to more aspects of the main topic being queried $I_q$ according to method M, is a document that may provide a better response made by that same method for the original query q. Furthermore, the strictness of this aspect-stability criterion shall have a fundamental role in this work for "identifying" those documents that provide better aspect coverage. In some embodiment, any relaxation of this criterion usually results in an inferior re-ranking performance.

Next, two different scoring components that are based on the basic document aspect-stability property are identified. The first component, denoted $P_{rank}(d;\alpha)$, captures the relationship between the document's position in the initial retrieved list $D_q^{[k]}$, and that in the aspect-response list $D_q \vee_\alpha^{[k]}$. Noting that aspect-stability may not be a unique property, the second component, denoted $P_{uniq}(\alpha)$ further scores documents based on this fact.

The basic motivation behind the $P_{rank}(d; \alpha)$ scoring component is that, aspect-stable documents that were originally ranked higher in $D_q^{[k]}$ should be more preferred. This is attributed to the fact that, the higher a document $d \in D_q^{[k]}$ rank is, the more strict is the aspect-stability criterion it must satisfy (see Equation 3). By satisfying a more stringent criterion for a given aspect $\alpha \in A_q$, such a document is assumed to provide a better response (in terms of aspect coverage) to that specific aspect of the searched information need. Furthermore, for a given aspect $\alpha \in A_q$, the rank of an aspect-stable document $d \in D_q^{[k]} \cap D_q \vee_\alpha^{[k]}$ may actually be higher than its original rank (i.e., $r_{d;q} \vee_\alpha < r_{d;q}$). This would imply that, according to retrieval method M, document d provides a better coverage for aspect a relatively to at least one of the other documents that were previously ranked higher than d in $D_q^{[k]}$. Moreover, since document d is aspect-stable, such aspect coverage comes with "minimum sacrifice" of its ability to provide a potential "relevant" response to the original information need being searched. In accordance, the higher the gain in the document's rank is, the more important it should be.

Let τ(l,r) denote a rank coefficient that depends on the number of possible ranks l and a specific rank r, such that: r>l ⇒ τ(l,r)=0; r<r' ⇒ τ(l,r)>τ(l,r'); and $\Sigma_{r=1}^l \tau(l,r)=1$. One such rank coefficient that is being utilized in this work is defined as follows:

$$\tau(l, r) \stackrel{def}{=} \max\left(0, \frac{2(l+1-r)}{l(l+1)}\right). \quad (4)$$

According to τ(l,r), a document's importance is determined in a linear fashion according to its rank. The two aspect-stability document rank dimensions that were mentioned above are now captured by $P_{rank}(d;\alpha)$ using $\tau(l,r)$ as follows:

$$\mathcal{P}_{rank}(d;a) \stackrel{def}{=} \tau(k, r_{d;q}) \cdot (1 + \tau(r_{d;q}, r_{d;q \vee a})), \quad (5)$$

where k is the number of documents in the initial list $D_q^{[k]}$. Note that, the higher the original document rank $r_{d;q}$ is and the larger its improvement in rank in aspect-response $D_q \vee_\alpha^{[k]}$ (i.e., $r_{d;q}-r_{d;q\vee\alpha}$), the higher its $P_{rank}(d;\alpha)$ score would be.

As described supra, a document's (i.e., an given additional result 50) aspect-stability may not be unique and may vary for different aspects in $A_q$. For a given aspect $\alpha \in A_q$, the aspect-stability uniqueness of a given document $d \in D_q^{[k]} \cap D_q \vee_\alpha^{[k]}$ actually depends on the overall number of documents in $D_q^{[k]}$ that are also aspect-stable with respect to that same aspect. The fewer such documents, the more document d's aspect-stability would be unique, implying that it might be less "sensitive" to query-drift with respect to aspect a. Hence, such a document would be more preferable. The aspect-stability uniqueness of a given aspect $\alpha \in A_q$ is determined by the inverse frequency of documents in $D_q^{[k]}$ that are aspect-stable with respect to that aspect, i.e.:

$$\mathcal{P}_{uniq}(a) \stackrel{def}{=} \begin{cases} \log\left(\frac{1}{2} + \frac{k+2}{2 - \sum_{d \in D_q^{[k]}} \delta_{d;a}}\right), & \sum_{d \in D_q^{[k]}} \delta_{d;a} > 0 \\ 0, & \text{else} \end{cases} \quad (6)$$

$P_{uniq}(\alpha)$ is maximized whenever $D_q^{[k]}$ includes only a single aspect-stable document and is further minimized whenever none of the documents in $D_q^{[k]}$ are aspect-stable. Moreover, the case where all the documents in $D_q^{[k]}$ are aspect-stable, is the case in which aspect a may not serve as a good "differentiator" between "better" or "worse" documents. Hence, in such a case, this aspect would contribute the least to the overall (re-)scoring of documents for re-ranking.

The three basic scoring components (i.e., $P_{rsp}(\alpha)$, $P_{rank}(d;\alpha)$ and $P_{uniq}(\alpha)$) are combined together using their weighted power mean. Therefore, given a document $d \in D_q^{[k]}$ and aspect $\alpha \in A_q$, the overall aspect-stability score of that document is calculated as follows:

$$\varphi_{d;a}^{[\alpha,\beta]} \stackrel{def}{=} \delta_{d;a} \cdot \mathcal{P}_{rsp}(a)^\alpha \cdot \mathcal{P}_{rank}(d;a)^\beta \cdot \mathcal{P}_{uniq}(a)^{1-\alpha-\beta}, \quad (7)$$

where $\alpha$ and $\beta$ are two coefficients such that $0 \le \alpha+\beta \le 1$ allowing to control the relative importance of each scoring component. Note that, the combined score strictly follows the aspect-stability criterion defined in Equation (3) by further multiplying the combined score in $\delta_{d;\alpha}$ (hence, $\delta_{d;\alpha}=0 \Rightarrow \varphi_{d;\alpha}^{[\alpha,\beta]}=0$).

As described in step 78 in the description referencing the flow diagram shown FIG. 2 hereinabove, processor 24 calculates ranking scores 54 in order to be able to re-rank additional results 50. In some embodiments, as described hereinbelow, processor 24 can calculate a ranking score 54 for a given additional entry 50 based on the respective stability scores 56 (i.e., Equations 3, 5 and 6, and/or Equation 7 described supra) for the given additional entry. In an alternative embodiment (also described hereinbelow), processor 24 can calculate a ranking score 54 for a given additional entry 50 in an additional result list 42 based on the respective stability scores 56 for the given additional entry and the respective additional list score for the given additional list.

The final re-ranking score of documents in $D_q^{[k]}$ is calculated by aggregating the aspect-stability scores obtained for the various aspects in $A_q$. Such aggregation is implemented using a voting-based fusion approach. Within such an approach, each agent $\alpha \in A_q$ represents a single "voter", whose aspect-response $D_q \vee_\alpha^{[k]}$ represents that voter's "opinion" (or preference list) about the top-k documents in D that best satisfy the information need expressed in the expanded query $q \vee \alpha$. To this end, for a given document $d \in D_q \vee_\alpha^{[k]}$, its corresponding score $Score_q \vee_\alpha(d)$ represents aspect a voter's opinion. For each aspect $\alpha \in A_q$, document scores $Score_q \vee_\alpha(d)$ are further sum-normalized. Per voted document $d \in D_q^{[k]}$, various voters are assumed to have varying "confidence" about their vote which is (rank-wise) proportional to d's corresponding aspect-stability score $\varphi_{d;\alpha}^{[\alpha,\beta]}$.

The overall aspect-stability score of a given document $d \in D_q^{[k]}$ (denoted $Score_q^{Stad}(d)^7$) is calculated by summing all \aspect voters" scores, as follows:

$$Score_q^{Stad}(d) \stackrel{def}{=} \sum_{q \in \mathcal{A}_q} \varphi_{d;a}^{[\alpha,\beta]} \cdot Score_{q \vee a}(d) \quad (8)$$

Noting that some documents $d \in D_q^{[k]}$ may appear in several aspect-responses, a further reward may be given to those documents that appear in more such lists; similarly in spirit to the CombMNZ fusion method. Therefore, a refined aspect-stability score that further captures such fact is calculated as follows:

$$Score_q^{StadMNZ}(d) \stackrel{def}{=} MNZ(d) \cdot Score_q^{Stad}(d), \quad (9)$$

where MNZ(d) is taken as the (log-scaled) number of aspect-responses that include a given document $d \in D_q^{[k]}$, in addition to its inclusion in $D_q^{[k]}$, i.e.:

$$MNZ(d) \stackrel{def}{=} \log\left(2 + \sum_{a \in \mathcal{A}_q} \delta[d \in D_{q \vee a}^{[k]}]\right) \quad (10)$$

The final re-ranking score of a given document is $d \in D_q^{[k]}$ is obtained by multiplying (boosting) the original document's score $Score_q(d)$ with its aspect-stability score (i.e., either $Score_q^{Stad}(d)$ or $Score_q^{StadMNZ}(d)$).

The invention claimed is:
1. A method, comprising:
receiving a first query term from a user;
submitting, to a search engine, a first query comprising the first query term;
receiving, in response to submitting the first query, a first list comprising first search results having respective first rankings;
deriving multiple keywords from the first query term;

submitting, for each given derived keyword, a respective second query to the search engine, the respective second query comprising the first query term and the given derived keyword;

receiving, in response to submitting each of the respective second queries, a respective second list comprising respective second search results having respective second rankings;

computing, for each given first search result appearing in one or more of the second lists, a stability score that computes a stability of the given first search result across the second queries by measuring a difference between the first ranking of the given first search result from the first query in the first list and the second rankings of the given first search result in the second lists;

re-ranking the first search results appearing in one or more of the second list based on their respective first rankings and stability scores in a manner preferring first search results having stability scores indicative that their ranking in the second lists is greater than or equal their ranking in the first list; and presenting the re-ranked first search results to the user.

2. The method according to claim 1, and comprising identifying, in each of the second lists, a number of the second search results that are stable.

3. The method according to claim 2, wherein computing the stability score for a given first search result in the first list comprises computing, for each given corresponding second search result in each given second list, a first additional stability score based on a stability of the given second search result and the first ranking of the given first search result, computing a second additional stability score based on a difference between the second ranking of the given second search result and the first ranking of the given first result, and computing a third additional stability score based on the stability of the given-second search result in the given second list and the number of the stable second search results in the given second list.

4. The method according to claim 1, and comprising computing a first list quality score for the first list, and computing respective second list quality scores for each of the second lists, and wherein the one or more additional stability scores are computed for a given second search result in a given second list if the second list quality score for the given second list is greater than the first list quality score.

5. The method according to claim 4, wherein re-ranking the first search results based on their respective stability scores comprises computing, for each given first result, a ranking score based on the one or more additional stability scores of the corresponding second search results and the second list quality scores of the second lists, and sorting the first search results in the first list by their respective ranking scores.

6. The method according to claim 4, wherein re-ranking the second first search results based on their respective stability scores comprises computing for each given first search result, a ranking score based on the one or more additional stability scores of the corresponding second search results, and sorting the first search results in the first list by their respective ranking scores.

7. The method according to claim 1, wherein each of the first and the second query results comprises a document.

8. An apparatus, comprising:
a memory; and
a processor configured:

to receive a first query term from a user, to submit, to a search engine, a first query comprising the first query term, to receive first query term;

receiving, in response to submitting the first query, a first list comprising first search results having respective first ranking, to derive multiple keywords from the first query term, to submit, for each given derived keyword, a respective second query to the search engine, the respective second query comprising the first query term and the given derived keyword, to receive, in response to submitting each of the respective second queries, a respective second list comprising respective second search results having respective second rankings, to compute, for each given first search result appearing in one or more of the second lists, a stability score that computes a stability of the given first search result across the second queries by measuring a difference between the first ranking of the given first search result from the first query in the first list and the second rankings of the given first search result in the second lists, to re-rank the first search results appearing in one or more of the second list based on their respective first rankings and stability scores in a manner preferring first search results having stability scores indicative that their ranking in the second lists is greater than or equal their ranking in the first list, and to present the re-ranked first search results to the user.

9. The apparatus according to claim 8, wherein the processor is configured to identify, in each of the second lists, a number of the search results that are stable.

10. The apparatus according to claim 9, wherein each of the first and the second query results comprises a document.

11. The apparatus according to claim 9, wherein the processor is configured to compute the stability score for a given first search result in the first list by computing, for each given corresponding second search result in each given second list, a first additional stability score based on a stability of the given second search result and the first ranking of the given first search result, computing a second additional stability score based on a difference between the second ranking of the given second search result and the first ranking of the given first result, and computing a third additional stability score based on the stability of the given-second search result in the given second list and the number of the stable second search results in the given second list.

12. The apparatus according to claim 8, wherein the processor is configured to compute a first list quality score for the first list, and to compute respective second list quality scores for each of the second lists, and wherein the processor is configured to compute the one or more additional stability scores for a given second search result in a given second list if the second list quality score for the given second list is greater than the first list quality score.

13. The apparatus according to claim 12, wherein the processor is configured re-rank the first search results based on their respective stability scores by computing, for each given first result, a ranking score based on the one or more additional stability scores of the corresponding second search results and the second list quality scores of the second lists, and sorting the first search results in the first list by their respective ranking scores.

14. The apparatus according to claim 12, wherein the processor is configured to re-ranking the second first search results based on their respective stability scores by computing for each given first search result, a ranking score based on the one or more additional stability scores of the corresponding second search results, and sorting the first search results in the first list by their respective ranking scores.

15. A computer program product, the computer program product comprising:
a non-transitory computer readable storage medium having computer readable program code embodied therewith, the computer readable program code comprising:
computer readable program code configured to receive a first query term from a user;
computer readable program code configured to submit, to a search engine, a first query comprising the first query term;
computer readable program code configured to receive, in response to submitting the first query, a first list comprising first search results having respective first rankings;
computer readable program code configured to derive multiple keywords from the first query term;
computer readable program code configured to submit, for each given derived keyword, a respective second query to the search engine, the respective second query comprising the first query term and the given derived keyword;
computer readable program code configured to receive, in response to submitting each of the respective second queries, a respective second list comprising respective second search results having respective second rankings;
computer readable program code configured to compute, for each given first search result appearing in one or more of the second lists, a stability score that computes a stability of the given first search result across the second queries by measuring a difference between the first ranking of the given first search result from the first query in the first list and the second rankings of the given first search result in the second lists;
computer readable program code configured to re-rank the first search results appearing in one or more of the second list based on their respective first rankings and stability scores in a manner preferring first search results having stability scores indicative that their ranking in the second lists is greater than or equal their ranking in the first list; and
computer readable program code configured to present the re-ranked first search results to the user.

16. The computer program product according to claim 15, wherein the computer readable program code is configured to identify, in each of the second lists, a number of the second search results that are stable.

17. The computer program product according to claim 16, wherein the computer readable program code is configured to compute the stability score for a given-first search result in the first list by computing, for each given corresponding second search result in each given second list, a first additional stability score based on a stability of the given second search result and the first ranking of the given first search result, computing a second additional stability score based on a difference between the second ranking of the given second search result and the first ranking of the given first result, and computing a third additional stability score based on the stability of the given second search result in the given second list and the number of the stable second search results in the given second list.

18. The computer program product according to claim 15, wherein the computer readable program code is configured to compute a first list quality score for the first list, and to compute respective second list quality scores for each of the second lists, and wherein the computer readable program code is configured to compute one or more additional stability scores for a given second search result in a given second list if the second list quality score for the given second list is greater than the first list quality score.

19. The computer program product according to claim 18, wherein the computer readable program code is configured to re-rank the first search results based on their respective stability scores by computing, for each given first result, a ranking score based on the one or more additional stability scores of the corresponding second search results and the second list quality scores of the second lists, and sorting the first search results in the first list by their respective ranking scores.

20. The computer program product according to claim 18, wherein the computer readable program code is configured to re-ranking the second first search results based on their respective stability scores by computing for each given first search result, a ranking score based on the one or more additional stability scores of the corresponding second search results, and sorting the first search results in the first list by their respective ranking scores.

* * * * *